(12) United States Patent
Yang et al.

(10) Patent No.: US 11,508,044 B2
(45) Date of Patent: Nov. 22, 2022

(54) METHOD FOR TRANSLATING IMAGE, METHOD FOR TRAINING IMAGE TRANSLATION MODEL

(71) Applicant: BEIJING BAIDU NETCOM SCIENCE AND TECHNOLOGY CO., LTD., Beijing (CN)

(72) Inventors: Shaoxiong Yang, Beijing (CN); Chen Zhao, Beijing (CN)

(73) Assignee: BEIJING BAIDU NETCOM SCIENCE AND TECHNOLOGY CO., LTD., Beijing (CN)

( * ) Notice: Subject to any disclaimer, the term of this patent is extended or adjusted under 35 U.S.C. 154(b) by 106 days.

(21) Appl. No.: 17/115,996

(22) Filed: Dec. 9, 2020

(65) Prior Publication Data
US 2021/0374920 A1  Dec. 2, 2021

(30) Foreign Application Priority Data
Jun. 1, 2020 (CN) .......................... 202010484916.4

(51) Int. Cl.
*G06T 5/00* (2006.01)
*G06T 7/149* (2017.01)
*G06T 5/50* (2006.01)

(52) U.S. Cl.
CPC ................ *G06T 5/006* (2013.01); *G06T 5/50* (2013.01); *G06T 7/149* (2017.01)

(58) Field of Classification Search
CPC ........... G06T 5/006; G06T 5/50; G06T 7/149; G06T 3/0093; G06T 3/40; G06T 2207/20081; G06T 2207/20221; G06T 2207/30201
See application file for complete search history.

(56) References Cited

U.S. PATENT DOCUMENTS 9,443,316 B1  9/2016  Takeda et al.
2016/0350893 A1*  12/2016  Fletcher ................ G06T 3/0081
2018/0247201 A1  8/2018  Liu et al.
(Continued)

OTHER PUBLICATIONS

Yuzhu Ji et al., "Saliency detection via conditional adversarial image-to-image network", 2018, Neurocomputing, vol. 316, pp. 357-368 (Year: 2018).*

(Continued)

*Primary Examiner* — Chan S Park
*Assistant Examiner* — Daniel C Chang
(74) *Attorney, Agent, or Firm* — Bridgeway IP Law Group, PLLC; Jihun Kim

(57) ABSTRACT

A method for translating an image, a method for training an image translation model, and related electronic devices are proposed. In the method for translating an image, an image translation request carrying an original image is obtained. A down-sampled image is generated by down sampling the original image. A pre-translated image, a mask image, and deformation parameters are generated based on the down-sampled image. A size of the pre-translated image and a size of the mask image are the same as a size of the original image. A deformed image is obtained by deforming original image based on the deformation parameters. The deformed image, the pre-translated image and the mask image are fused to generate a target translation image.

18 Claims, 10 Drawing Sheets

(56) References Cited

U.S. PATENT DOCUMENTS

2018/0247281 A1    8/2018   Rajaraman et al.
2019/0295302 A1*   9/2019   Fu .......................... G06T 11/60

OTHER PUBLICATIONS

Zili Yi et al., "DualGAN: Unsupervised Dual Learning for Image-to-Image Translation", 2017, 2017 IEEE International Conference on Computer Vision (ICCV), arXiv:1704.02510v4, pp. 1-17 (Year: 2017).*
Yuzhu Ji et al., "Saliency detection via conditional adversarial image-to-image network", ELSEVIER, Aug. 5, 2018.
Zhenfeng Shao et al., "Remote Sensing Image Fusion With Deep Convolutional Neural Network", IEEE Journal of Selected Topics in Applied Earth Observations and Remote Sensing, pp. 1656-1669, vol. 11, No. 5, May 2018.
Marek Blaszczyk, "Search Report for EP application 20217425.6", dated May 7, 2021, European Patent Office, DE.
Zili Yi et al., "DualGAN: Unsupervised Dual Learning for Image-to-Image Translation", Oct. 9, 2018.
Norikau Arai, "Office Action for JP Application No. 2021-215551", dated Mar. 1, 2022, JPO, Japan.
Jeong Seong Yoon, "Office Action for KR Application No. 10-2020-0183269", dated Apr. 27, 2022, KIPO, Republic of Korea.

* cited by examiner

METHOD FOR TRANSLATING IMAGE, METHOD FOR TRAINING IMAGE TRANSLATION MODEL

CROSS REFERENCE TO RELATED APPLICATIONS

This application claims priority and benefits to Chinese Application No. 202010484916.4, filed on Jun. 1, 2020, the entire content of which is incorporated herein by reference.

TECHNICAL FIELD

The disclosure relates to a field of image processing technology, particularly to a field of deep learning and image processing technology, and particularly to a method and apparatus for translating an image, and a method and an apparatus for training an image translation model.

BACKGROUND

A type of image may be directly translated into another type of image without changing the image content via an image translation network, which has been widely applied to fields of image generation, scene segmentation, image stylization and the like.

SUMMARY

Embodiments of the disclosure provide a method for translating an image, executed by an electronic device. The method includes:

obtaining an image translation request, in which the image translation request carries an original image;

down sampling the original image to generate a down-sampled image corresponding to the original image;

generating a pre-translated image corresponding to the original image, a mask image and deformation parameters corresponding to each pixel of the original image based on the down-sampled image, in which a size of the pre-translated image and a size of the mask image are the same as a size of the original image;

deforming the original image based on the deformation parameters to generate a deformed image; and fusing the deformed image, the pre-translated image and the mask image to generate a target translation image.

Embodiments of the disclosure further provide a method for training an image translation model. The method includes:

obtaining a set of training samples, in which the set of training samples includes a set of first images belonging to a first domain and a set of second images belonging to a second domain;

down sampling the set of first images respectively to generate a set of first down-sampled images;

processing the set of first down-sampled images respectively with a first initial generator to generate a set of first pre-translated images, a set of first mask images, and a set of first deformation parameters, in which each first deformation parameter in the set of first deformation parameters corresponds to a respective pixel of the first image in the set of first images respectively;

deforming the set of first images respectively based on the set of first deformation parameters to obtain a set of first deformed images;

fusing each first deformed image in the set of first deformed images, each first pre-translated image in the set of first pre-translated images, and each first mask image in the set of first mask images to obtain a set of third images;

inputting the set of third images to a first initial discriminator to obtain a set of first probabilities that each third image is a real image;

inputting the set of second images to the first initial discriminator, to obtain a set of second probabilities that each second image is a real image; and correcting the first initial generator and the first initial discriminator based on the set of first probabilities and the set of second probabilities, to generate a first target generator belonging to the first domain, in which the first target generator belonging to the first domain is configured to translate an image in the first domain into an image in the second domain.

Embodiments of the disclosure further provide an electronic device. The electronic device includes at least one processor and a memory communicatively coupled to the at least one processor. The memory is configured to store instructions executable by the at least one processor. When the instructions are executed by the at least one processor, the at least one processor is configured to execute the above-mentioned method for translating an image and the above-mentioned method for training an image translation model.

Embodiments of the disclosure further provide a non-transitory computer-readable storage medium, having computer instructions stored thereon. The computer instructions are configured to cause a computer to execute the above-mentioned method for translating an image and the above-mentioned method for training an image translation model.

It should be understood that the content described in this section is neither intended to identify key or important features of the embodiments of the present disclosure, nor intended to limit the scope of the present disclosure. Other features of the present disclosure will be easily understood by the following description.

BRIEF DESCRIPTION OF THE DRAWINGS

The drawings are used to better understand this solution, and do not constitute a limitation to the disclosure, wherein.

DETAILED DESCRIPTION

Figure 1:
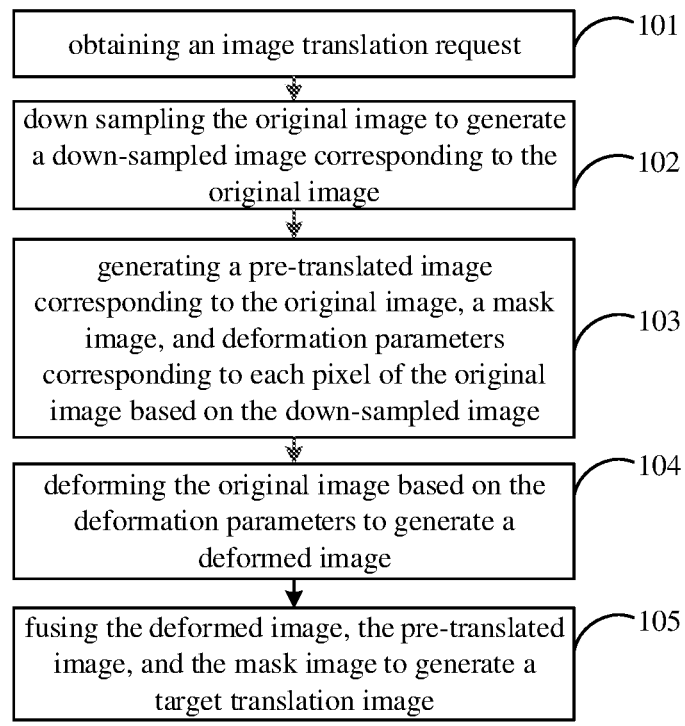
FIG. 1 is a schematic flowchart illustrating a method for translating an image according to embodiments of the present disclosure.

The example embodiments of the disclosure are described below in conjunction with the accompanying drawings, which include various details of the embodiments of the disclosure to facilitate understanding and should be considered as merely exemplary. Therefore, it should be recognized for those skilled in the art that various changes and modifications may be made to the embodiments described herein without departing from the scope and spirit of the disclosure. Likewise, for clarity and conciseness, descriptions of well-known functions and structures are omitted in the following description.

For an existing method for translating an image, there is a relatively large computation burden in the image translation.

Generally, computation burden of translating an image may be reduced in the related art by continuously simplifying the structure of the translation model or directly reducing the resolution of the input image. However, the existing method for translating an image may cause low definition of the translated image and a significantly reduced effect of the image translation.

A method and an apparatus for translating an image, a method and an apparatus for training an image translation model, an electronic device, and a storage medium according to embodiments of the disclosure will be described below with reference to the drawings.

In related arts, reducing the computation amount of image translation by simplifying the structure of the translation model or directly reducing the resolution of the input image may cause a low definition of the translated image, while greatly reducing the effect of translating the image. In view of the above, the disclosure provides a method for translating an image.

In the method for translating an image according to embodiments of the disclosure, an image translation request is obtained. The original image carried in the image translation request is down sampled to generate a down-sampled image corresponding to the original image. A pre-translated image corresponding to the original image, a mask image, and deformation parameters corresponding to each pixel of the original image are generated based on the down-sampled image. A size of the pre-translated image is the same as a size of the original image, and a size of the mask image is the same as the size of the original image. The original image is deformed based on the deformation parameters to generate a deformed image. The deformed image, the pre-translated image, and the mask image are fused to generate a target translation image. Therefore, the original image is down sampled as an input to reduce the computation amount of translating an image. In addition, the target translation image with the same size as the original image is output. The generated target translation image includes the deformed image formed from the original image, which ensures image translation effect while reducing computation burden of translating the image. Furthermore, the target translation image makes full use of high-definition and rich high-frequency detail information of the input original image, which greatly improves the definition of the generated target translation image.

FIG. 1 is a schematic flowchart illustrating a method for translating an image according to embodiments of the disclosure.

It should be noted that the method for translating the image according to embodiments of the disclosure may be executed by an apparatus for translating the image. The apparatus may be integrated in an electronic device to deform the original image based on the deformation parameters to obtain a deformed image and fuse the deformed image, the pre-translated image, and the mask image to generate the target translation image. The electronic device may be any terminal device or server that may perform data processing, which is not limited in the disclosure.

As illustrated in FIG. 1, the method for translating an image may include the following.

At block 101, an image translation request is obtained. The original image may be carried in the image translation request.

In practice, the image translation request may be obtained through different implementations in different scenarios. In some implementations, the user may input an instruction related to the image translation request through an input box.

In some implementations, it may be considered that the image translation request is obtained in response to obtaining the trigger operation from the user on the image translation program. For example, it may be considered that the image translation request is obtained in response to that the user clicks a button on a touch screen for triggering the image translation.

In some implementations, a hook function may be set in a message control function of an image translation program in advance, such that a message related to the image translation request may be detected based on the hook function. In detail, a triggering message may be sent in response to an image translation request from the user. In this case, the message control function may be called. The hook function set in the message control function may detect the calling of the message control function and the message related to the image translation request may be identified based on the message type of the triggering message that triggers the message control function.

At block 102, the original image is down sampled to generate a down-sampled image corresponding to the original image. A size of the down-sampled is less than a size of the original image.

Down sampling the original image refers to reducing the size of the original image to make the down-sampled image fit the size of a display area or to generate a corresponding down-sampled image. For example, the size of the original image is M×N. The down-sampled image with a size of (M/s)×(N/s) may be obtained after down sampling the image by a factor of s.

That is, the original image is down sampled to generate a down-sampled image after obtaining the original image from the translation request and the down-sampled image is used as an input, thereby significantly reducing the computation burden. For example, in an application scenario of conversion between a male face and a female face and in cases that the original image is an image (with a resolution of 256×256) of a male face, a down-sampled image with a resolution of 128×128 may be obtained after down sampling the original image by twice (i.e., a factor of 2). The size of the feature map is reduced to a half of the size of original feature map, and the theoretical computation burden will be reduced to 0.25 times of the original computation burden accordingly.

At block 103, a pre-translated image corresponding to the original image, a mask image, and deformation parameters corresponding to each pixel of the original image are generated based on the down-sampled image. A size of the pre-translated image and a size of the mask image are the same as the size of the original image.

In detail, the down-sampled image may be deconvolved to enlarge its size to the size of the original image to obtain an enlarged image after inputting the down-sampled image. The enlarged image is processed to generate the pre-translated image corresponding to the original image, the mask image and the deformation parameters corresponding to each pixel of the original image.

The deformation parameters include a translation amount in a x-axis direction and a translation amount in a y-axis direction corresponding to each pixel. The mask image is a template for filtering the image. In some examples, the mask image is mainly used to shield certain areas on the image with a mask to disable the shielded areas in the processing or the calculation of processing parameters. In some examples, the mask image is mainly used to detect and extract structural features similar to the mask from the image using similarity variables or an image matching method.

For example, in the application scenario of conversion between a male face and a female face, the original image is an image of the male face with a resolution of 256×256 and the resolution of the corresponding down-sampled image is 128×128. The down-sampled image is deconvolved to increase the resolution of the down-sampled image to 256×256, i.e., a deconvolved image with the resolution of 256×256 is obtained. The image of the male face having the resolution of 256×256 is directly converted to an image of the female face, to generate an unfused image of the female face which is the pre-translated image corresponding to the original image. Further, the corresponding mask image and deformation parameters are obtained. The resolution of the pre-translated image is 256×256, the resolution of the mask image is 256×256, and 256×256 groups of deformation parameters are obtained. Each group of deformation parameters includes a parameter in x-axis direction and a parameter in y-axis direction.

At block 104, the original image is deformed based on the deformation parameters to obtain the deformed image.

The original image may be deformed based on the deformation parameters through an image transformation tool to generate the deformed image.

For example, the original image is the image of the male face, and the deformation parameters indicate that male eyebrow areas are narrowed in the y-axis direction. The deformed image with narrowed eyebrow areas may be obtained after deforming the original image based on the deformation parameters through the image transformation tool. The deformed image is closer to characteristics of female eyebrows.

At block 105, the deformed image, the pre-translated image, and the mask image are fused to generate a target translation image.

In detail, in a case that the computation burden of translating the image is reduced by directly reducing the resolution of the input image, the definition of the translated image is low and the effect of translating the image is significantly reduced since the resolution of the output image is the same as the resolution of the input image in actual operations.

In the disclosure, the original image is down sampled and the down-sampled image is used as the input, to reduce the computation burden of translating the image. The down-sampled image is processed to generate the pre-translated image having the same size as the original image, the corresponding mask image and deformation parameters. The original image is further deformed based on the deformation parameters to obtain the deformed image. The deformed image and the pre-translated image are fused based on respective weights indicated by the mask image to generate the target translation image. Therefore, the size of the target translation image is the same as the size of the original image while the computation burden of translating the image is reduced. In addition, since the generated target translation image contains the deformed image generated from the original image, the target translation image makes full use of high-definition and rich high-frequency detail information of the original image, which greatly improves the definition of the generated target translation image, and the background part of the generated target translation image is consistent with the original image, which may realize seamless fusion of the images and greatly improve the naturalness of the generated target translation image.

It should be noted that in above embodiments, the down-sampled image may be processed by a target generator to generate the pre-translated image corresponding to the original image, the mask image, and the deformation parameters corresponding to each pixel of the original image. The way of obtaining the target generator is different depending on various application scenarios.

In some implementations, a first domain to which the target translation image belongs may be obtained to obtain a first target generator based on the first domain. In some embodiments of the disclosure, the translation request further includes the first domain to which the target translation image belongs. Therefore, after the block 101, the method may further include obtaining the first target generator based on the first domain to which the target translation image belongs.

Accordingly, the block 103 may include processing the down-sampled image with the first target generator to generate the pre-translated image corresponding to the original image, the mask image, and the deformation parameters corresponding to each pixel of the original image.

In a field of image translation, domains are used to distinguish the original image and the target translation image. For example, in the application scenario of gender translation, the image of the male face and the image of the female face are in different domains. For example, in the application scenario of translating "apple" or "orange", the image containing an apple and the image containing an orange are in different domains.

The first domain to which the target translation image belongs in the disclosure corresponds to images of specified objects, such as the image of the female face or the image containing an apple.

In detail, different generators may be used for translating images of different domains. Therefore, in the disclosure, the first domain to which the target translation image belongs may be obtained from the translation request after receiving the translation request, and the first generator corresponding to the first domain may be determined based on the first domain. In cases that only one first generator corresponding to the first domain is obtained, the first target generator may be directly determined based on the first domain.

For example, in cases that the first domain to which the target translation image belongs corresponds to "female face", only a generator for converting an image of a male face to an image of a female face is determined based on the first domain. Therefore, the generator for converting an image of a male face to an image of a female face may be determined as the first target generator. In cases that the first domain to which the target translation image belongs corresponds to "young face", only a generator for converting an image of an old face to an image of a young face is determined. Therefore, the generator for converting an image of an old man face to an image of a young face may be determined as the first target generator.

Further, after the first target generator is determined, the down-sampled image may be directly processed by the first target generator to generate the pre-translated image corresponding to the original image, the mask image, and the deformation parameters corresponding to each pixel of the original image.

Therefore, before processing the down-sampled image, the dedicated first target generator may be determined based on the first domain to which the target translation image belongs to process the down-sampled image, thereby greatly improving the efficiency and accuracy of image processing.

It should be noted that, multiple generators may be obtained based on the first domain to which the target translation image belongs in actual operations. That is, multiple first generators may correspond to the first domain.

In cases that N first generators correspond to the first domain to which the target translation image belongs, where N is an integer greater than 1, after the block 101, the method may further include identifying the original image to determine a second domain to which the original image belongs and selecting one of the N first generators based on the second domain and the first domain.

In detail, the original image may be identified to obtain the second domain in response to determining that multiple first generators correspond to the first domain based on the first domain to which the target translation image belongs. One of the multiple first generators may be determined based on the first domain and the second domain.

For example, in cases that the first domain to which the target translation image belongs corresponds to "apple", multiple generators corresponding to the first domain may be determined based on the first domain, including a generator for converting an image containing an oranges to an image containing an apple, a generator for converting an image containing a pear to an image containing an apple, and a generator for converting an image containing a peach to an image containing an apple. In this case, in response to determining that the second domain corresponds to "orange", the generator for converting an image containing an orange to an image containing an apple may be selected from the above generators as the first target generator.

Further, after the first target generator is determined, the down-sampled image may be directly processed by the first target generator to generate the pre-translated image corresponding to the original image, the mask image and the deformation parameters.

When multiple first generators corresponding to the first domain are obtained based on the first domain, one of the first generators is selected as the first target generator based on the second domain. The down-sampled image is processed by the first target generator accordingly, which further improves the efficiency and accuracy of image processing.

In some implementations, the second domain to which the original image belongs may also be obtained, to obtain a second target generator based on the second domain. In some embodiments of the disclosure, after the block 101, the method may further include identifying the original image to determine a second domain to which the original image belongs and obtaining a second target generator based on the second domain.

Accordingly, the block 103 may include processing the down-sampled image with the second target generator, to generate the pre-translated image corresponding to the original image, the mask image, and the deformation parameters corresponding to each pixel of the original image.

In detail, after obtaining the original image, the original image may be recognized to obtain the second domain to which the original image belongs. After the second domain is determined, the second generator corresponding to the second domain may be determined based on the second domain to which the original image belongs. In cases that only one second generator corresponding to the second domain is obtained, the second target generator may be directly determined based on the second domain.

For example, in cases that the second domain to which the original image belongs corresponds to "male face", only a generator for converting an image of a male face to an image of a female face is determined based on the first domain. Therefore, the generator for converting an image of a male face to an image of a female face may be determined as the second target generator. In cases that the second domain to which the original image belongs corresponds to "old face", only a generator for converting an old face to an image of a young face is determined Therefore, the generator for converting an old face to an image of a young face may be determined as the second target generator.

Further, after the second target generator is determined, the down-sampled image may be directly processed by the second target generator to generate the pre-translated image corresponding to the original image, the mask image, and the deformation parameters.

Therefore, before processing the down-sampled image, the dedicated second target generator may be determined based on the second domain to which the original image belongs to process the down-sampled image, thereby greatly improving the efficiency and accuracy of image processing.

It should be noted that, multiple generators may be obtained based on the second domain to which the original image belongs in actual operations. That is, multiple second generators may correspond to the second domain.

In cases that M second generators correspond to the second domain to which the original image belongs, where M is an integer greater than 1, after the block 101, the method may further include obtaining the first domain to which the target translation image belongs; and selecting the second target generator from the M second generators based on the first domain and the second domain.

In detail, the first domain to which the target translation image belongs may be obtained in response to determining that multiple second generators correspond to the second domain to which the original image belongs. In cases that information of the first domain to which the target translation image belongs is included in the translation request, the first domain may be obtained directly from the translation request. In cases that information of the first domain to which the target translation image belongs is not included in the translation request and multiple second generators correspond to the second domain to which the original image belongs, a selection item for selecting a first domain may be provided to enable the user to select a first domain based on the image type and feature information of the target translation image. After the first domain to which the target translation image belongs is determined, one of the multiple second generators may be selected as the second target generator based on the first domain and the second domain.

For example, in cases that the second domain to which the original image belongs corresponds to "orange", multiple generator corresponding to the second domain may be determined based on the second domain, including a generator for converting an image containing an orange to an image containing an apple, a generator for converting an image containing an orange to an image containing a pear, and a generator for converting an image containing an orange to an image containing a peach. In this case, in response to determining that the first domain to which the target translation image belongs corresponds to "pear", the generator for converting an image containing an orange to an image containing a pear may be selected from the above second generators as the second target generator.

Further, after the second target generator is determined, the down-sampled image may be directly processed by the second target generator to generate the pre-translated image corresponding to the original image, the mask image and the deformation parameters.

When multiple second generators corresponding to the second domain are obtained based on the second domain, one of the second generators is selected as the second target generator based on the first domain. The down-sampled image is processed by the second target generator accordingly, which further improves the efficiency and accuracy of image processing.

It should be noted that when processing an image, the feature information of the image is generally extracted and the feature information is processed accordingly to realize the image processing.

Figure 2:
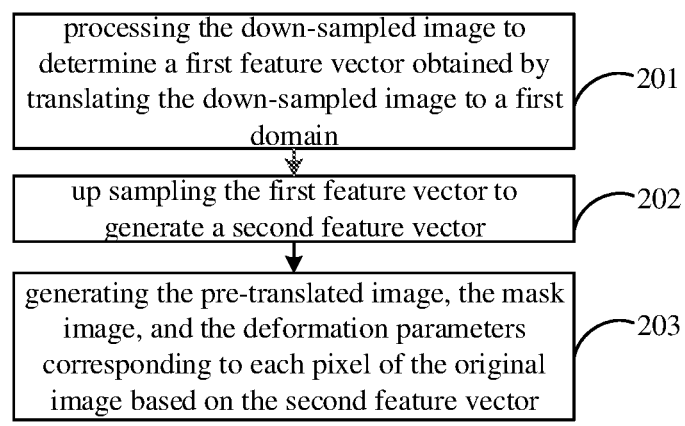
FIG. 2 is a schematic flowchart illustrating a method for translating an image according to embodiments of the present disclosure.

The method will be described below in conjunction with FIG. 2. As illustrated in FIG. 2, the block 103 may include the following.

At block 201, the down-sampled image is processed to determine a first feature vector obtained by translating the down-sampled image to a first domain to which target translation image belongs.

The first feature vector is a feature vector to be changed in directly converting the down-sampled image into the target translation image. The size of the first feature vector is the same as the size of the down-sampled image.

At block 202, the first feature vector is up sampled to generate a second feature vector.

In detail, since the size of the first feature vector is the same as the size of the down-sampled image, both the size of the pre-translated image and the size of the mask image obtained may be the same as the size of the down-sampled image if the down-sampled is directly processed based on the first feature vector, resulting in that the resolution of the target translation image is low. Therefore, the first feature vector needs to be up sampled, to increase the size of the first feature vector to generate the second feature vector.

At block 203, the pre-translated image, the mask image, and the deformation parameters corresponding to each pixel of the original image are generated based on the second feature vector.

In detail, after obtaining the second feature vector, the generator may decode the second feature vector and reconstruct an image of a target object in the second domain based on the second feature vector to generate the pre-translated image. In addition, the mask image and the deformation parameters are generated during reconstructing the image of the target object.

It may be understood that, in the disclosure, the size of an actually processed image is the same as the size of the down-sampled image in translating the original image. Performing up-sampling process only before decoding the first feature vector into the pre-translated image, the mask image and the deformation parameters not only ensures that the pre-translated image and the mask image are both the same size as the original image, but also significantly reduces the data processing amount during the image translation.

Further, in order to generate a high-definition and high-naturalness target translation image, after obtaining the pre-translated image, the mask image, and deformation parameters, the original image may be deformed based on the deformation parameters to obtain the deformed image, The deformed image and the pre-translated image are fused based on the weights indicated by the mask image to generate the target translation image.

Figure 3:
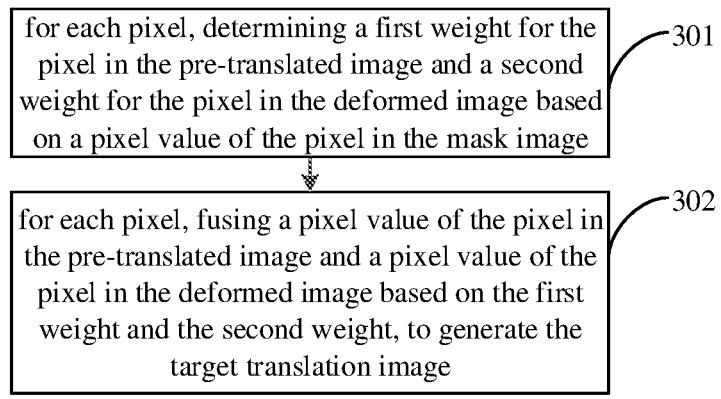
FIG. 3 is a schematic flowchart illustrating a method for translating an image provided by according to embodiments of the present disclosure.

Generating the target translation image may be described in detail below in conjunction with FIG. 3. As illustrated in FIG. 3, the block 104 may include the following.

At block 301, for each pixel, a first weight for the pixel in the pre-translated image and a second weight for a corresponding pixel in the deformed image are determined based on a pixel value of the pixel in the mask image.

At block 302, for each pixel, a pixel value of the pixel in the pre-translated image and the pixel value of the corresponding pixel in the deformed image are fused based on the first weight and the second weight, to generate the target translation image.

In detail, for each pixel, the first weight for the pixel in the pre-translated image and the second weight for the corresponding pixel in the deformed image may be determined based on the pixel value of the pixel in the mask image. For each pixel of the target translation image, a ratio between the pixel value of the pixel in the pre-translated image and the pixel value of the corresponding pixel in the deformed image is obtained based on a weight ratio between the first weight and second weight. The pixel value of each pixel in the pre-translated image is fused with the pixel value of each pixel in the deformed image based on the ratio.

In practice, the pixel value of a pixel in the mask image may be the weight for a corresponding pixel in the pre-translated image or the weight for the corresponding pixel in the deformed image. For example, in cases that the pixel value of an $i^{th}$ pixel in the mask image is 0.7, the weight for the $i^{th}$ pixel in the pre-translated image may be determined to be 0.7 (or 0.3), and the weight of the $i^{th}$ pixel in the deformed image may be 0.3 (or 0.7). In cases that the pixel value of the $i^{th}$ pixel in the pre-translated image is 10 and the pixel value of the $i^{th}$ pixel in the deformed image is 30, the pixel value of the $i^{th}$ pixel in the target translation image generated by fusing may be 16 or 24.

In some embodiments, the pixel is at the same position as the corresponding pixel, or an index of the pixel is the same as the index of the corresponding pixel.

Thus, the pixel value of each pixel in the deformed image is fused with the pixel value of each pixel in the pre-translated image based on the weights indicated by the mask image to generate the pixel value of each pixel in the target translation image. The pixel value of each pixel in the target translation image generated by fusing may not only meet requirements of the image translation, but also fully present the high-definition and rich high-frequency detail information of the original image, which greatly improves the definition of the generated target translation image. In addition, the background part of the generated target translation image is consistent with the original image, which may realize seamless fusion of the images and greatly improve the naturalness of the generated target translation image.

It should be noted that, in order to enable an electronic device to implement the method for translating an image according to embodiments to realize functions of real-time image translation, a ratio used for down sampling the original image to the down-sample image may be determined, to make the computation burden meets the requirements of the electronic device.

Therefore, in some embodiments of the disclosure, before the block S102, the method may further include obtaining attribute parameters of the electronic device and determining down-sampling coefficients based on the attribute parameters of the electronic device.

Accordingly, the block S102 may include down sampling the original image based on the down-sampling coefficients, to generate the down-sampled image corresponding to the original image.

The attribute parameters of the electronic device may include a frequency of central processing unit (CPU) and a number of cores of the electronic device.

In detail, a maximum computation burden that the electronic device may afford may be determined based on the attribute parameters of the electronic device. The down-sampling coefficients may be determined based on the computation burden. The original image is down sampled based on the down-sampling coefficients to generate the down-sampled image corresponding to the original image.

For example, the original image is an image of a male face having a resolution of 256×256 and the corresponding computation burden is X. In cases that the maximum computation burden that the electronic device can afford is 0.25X determined based on the attribute parameters of the electronic device, the original image may be down-sampled twice (by a factor of 2) to obtain the down-sampled image having the resolution of 128×128.

Thus, the ratio used for down sampling the image is determined based on the attribute parameters of the electronic device such that the computation burden meets the requirements of the electronic device, to enable the electronic device to realize the function of real-time image translation, improve the effect of image translation and increase the definition of the target translation image.

With the method for translating an image according to embodiments of the disclosure, the image translation request is obtained, the original image carried in the image translation request is down sampled to generate the down-sampled image corresponding to the original image, and the pre-translated image, the mask image and the deformation parameters corresponding to each pixel of the original image are generated based on the down-sampled image. Each of the size of the pre-translated image and the size of the mask image is the same as the size of the original image. The original image is deformed based on the deformation parameters to generate the deformed image. The deformed image, the pre-translated image and the mask image are fused to generate the target translation image. Therefore, the down-sample image obtained by down sampling the original image is the input to reduce the computation burden of the image translation, while outputting the target translation image having the same size as the original image. In addition, the generated target translation image includes the deformed image generated by deforming the original image, which improves the effect of image translation while reducing computation burden of the image translation. Furthermore, the target translation image makes full use of high-definition and rich high-frequency detail information of the original image, which greatly improves the definition of the generated target translation image.

Figure 4:
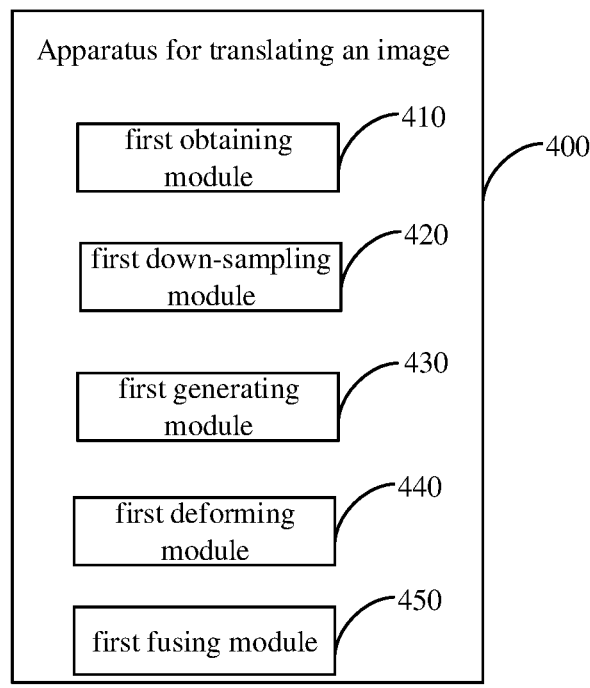
FIG. 4 is a structural schematic diagram illustrating an apparatus for translating an image according to embodiments of the present disclosure.

In order to implement the foregoing embodiments, an apparatus for translating an image is also provided according to embodiments of the disclosure. The apparatus for translating an image may be installed in an electronic device. FIG. 4 is a structural schematic diagram of an apparatus for translating an image provided by an embodiment of the application.

As illustrated in FIG. 4, the apparatus 400 for translating the image may include a first obtaining module 410, a first down-sampling module 420, a first generating module 430, a first deforming module 440, and a first fusing module 450.

The first obtaining module 410 is configured to obtain an image translation request, wherein the translation request carries an original image; the first down-sampling module 420 is configured to down sample the original image to generate a down-sampled image corresponding to the original image; the first generating module 430 is configured to generate a pre-translated image corresponding to the original image, a mask image, and deformation parameters corresponding to each pixel of the original image based on the down-sampled image, wherein a size of the pre-translated image and a size of the mask image are the same as a size of the original image; the first deforming module 440 is configured to deform the original image based on the deformation parameters to generate a deformed image; and the first fusing module 450 is configured to fuse the deformed image, the pre-translated image, and the mask image to generate a target translation image.

Figure 5:
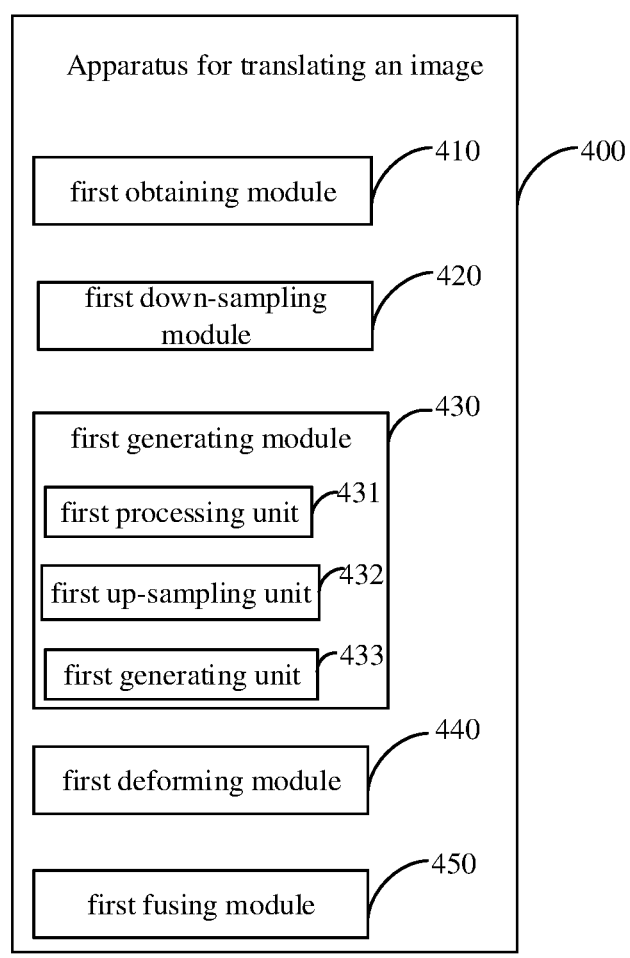
FIG. 5 is a structural schematic diagram illustrating an apparatus for translating an image according to embodiments of the present disclosure.

FIG. 5 is a structural schematic diagram of another apparatus for translating an image according to embodiments of the disclosure. In some implementations, as illustrated in FIG. 5, the first generating module 430 includes a first processing unit 431, a first up-sampling unit 432, and a first generating unit 433.

The first processing unit 431 is configured to process the down-sampled image to determine a first feature vector obtained by translating the down-sampled image to a first domain, wherein the target translation image is in the first domain; the up-sampling unit 432 is configured to up sample the first feature vector to generate a second feature vector; the first generating unit 433 is configured to generate the pre-translated image, the mask image, and the deformation parameters corresponding to each pixel of the original image based on the second feature vector.

In some implementations, the translation request further carries a first domain to which the target translation image belongs, and after obtaining the image translation request, the first obtaining module 410 is further configured to: obtain a first target generator based on the first domain; the first generating module 430 is specifically used to: process the down-sampled image with the first target generator, to generate the pre-translated image corresponding to the original image, the mask image, and the deformation parameters corresponding to each pixel of the original image.

In some implementations, in cases that the first domain corresponds to N first generators, where N is an integer greater than 1, after obtaining the image translation request, the first obtaining module 410 is further configured to: recognize the original image to determine a second domain to which the original image belongs; and select the first target generator from the N first generators based on the second domain and the first domain.

In some implementations, after obtaining the image translation request, the first obtaining module 410 is further configured to: recognize the original image to determine a second domain to which the original image belongs; and obtain a second target generator based on the second domain; the first generating module 430 is specifically configured to: process the down-sampled image with the second target generator, to generate the pre-translated image corresponding to the original image, the mask image, and the deformation parameters corresponding to each pixel of the original image.

In some implementations, in cases that the second domain corresponds to M second generators, where M is an integer greater than 1, after obtaining the image translation request, the first obtaining module 410 is further configured to: obtain a first domain to which the target translation image belongs; and select the second target generator from the M second generators based on the first domain and the second domain.

Figure 6:
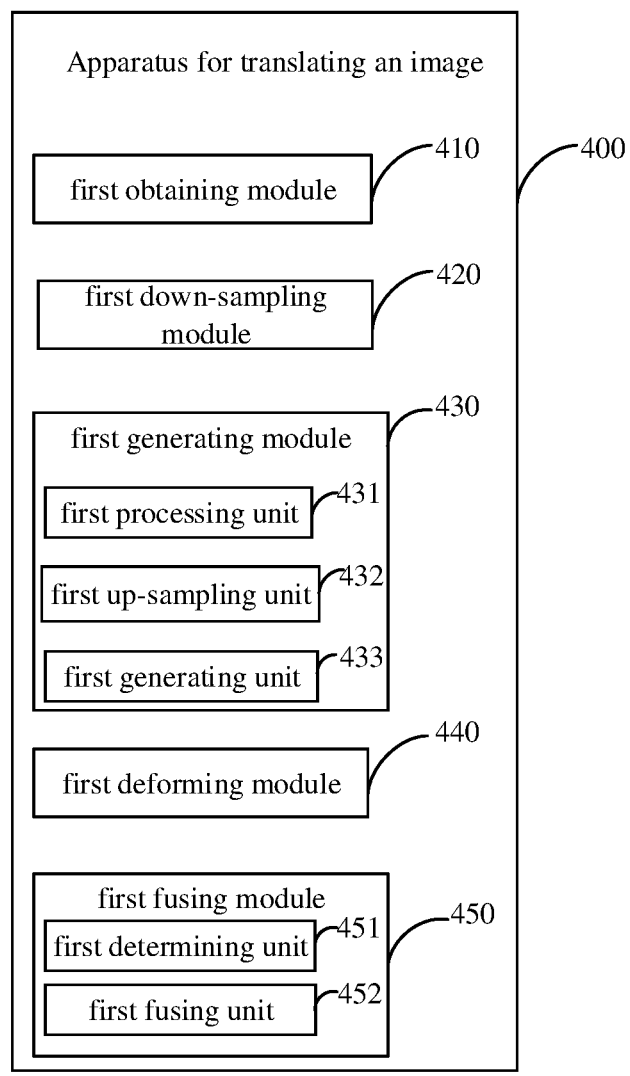
FIG. 6 is a structural schematic diagram illustrating an apparatus for translating an image according to embodiments of the present disclosure.

FIG. 6 is a structural schematic diagram of yet another apparatus for translating an image according to embodiments of the disclosure. In some implementations, as illustrated in FIG. 6, the first fusing module 450 includes a first determining unit 451 and a first fusing unit 452.

The first determining unit 451 is configured to for each pixel, determine a first weight for the pixel in the pre-translated image and a second weight for the pixel in the deformed image based on a pixel value of the pixel in the mask image; the first fusing unit 452 is configured to for each pixel, fuse a pixel value of the pixel in the pre-translated image and a pixel value of the pixel in the deformed image based on the first weight and the second weight, to generate the target translation image.

In some implementations, down sampling the original image to generate the down-sampled image corresponding to the original image, the first down-sampling module 420 is further configured to: obtain attribute parameters of the electronic device; and determine down-sampling coefficients based on the attribute parameters of the electronic device; the first sown-sampling module 420 is specifically configured to: down sample the original image based on the down-sampling coefficients, to generate the down-sampled image corresponding to the original image.

It should be noted that, the details that are not disclosed in the apparatus for translating an image of the embodiment of the disclosure refer to the details disclosed in the method for translating an image of the embodiment of the disclosure, without repeating again herein.

The apparatus for translating an image of the embodiment of the disclosure first obtains the image translation request by a first obtaining module, down-samples the original image in the translation request by a first down-sampling module to generate a down-sampled image corresponding to the original image, generates a pre-translated image and a mask image with the same size as and corresponding to the original image as well as deformation parameters corresponding to each pixel of the original image based on the down-sampled image by a generating module, deforms the original image based on the deformation parameters by a first deforming module to generate a deformed image, and finally fuses the deformed image, the pre-translated image, and the mask image by a first fusing module to generate a target translation image. As a result, the original image is down sampled as an input to reduce the computation burden of translating an image while the target translation image with the same size as the original image is output, and the generated target translation image includes the deformed image formed from the original image, which ensures image translation effect while reducing computation burden of translating the image. Furthermore, the target translation image makes full use of high-definition and rich high-frequency detail information of the input original image, which greatly improves the definition of the generated target translation image.

Figure 7:
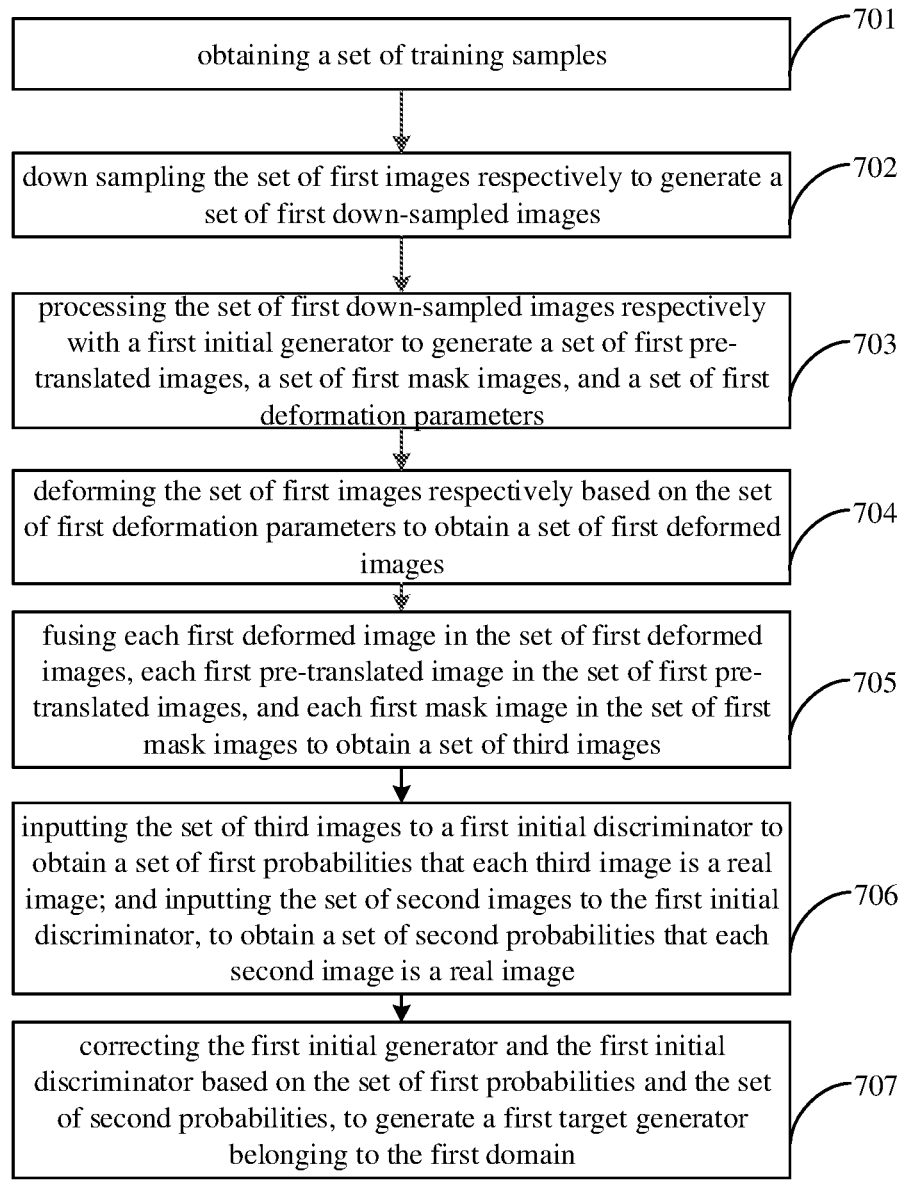
FIG. 7 is a schematic flowchart illustrating a method for training an image translation model according to embodiments of the present disclosure.

For implementing the above, embodiments of the disclosure provide a method for training an image translation model. The method for translating an image may be implemented by the image translation model. FIG. 7 is a schematic flowchart illustrating a method for training an image translation model according to embodiments of the disclosure.

It should be noted that the method for training an image translation model according to embodiments of the disclosure may be executed by an apparatus for training an image translation model. The apparatus may be integrated in an electronic device to train the image translation model to obtain the first generator. The electronic device may be any terminal device or server that may perform data processing, which is not limited in the disclosure.

As illustrated in FIG. 7, the method for training an image translation model may include the following.

At block 701, a set of training samples is obtained.

The set of training samples includes a set of first images belonging to a first domain and a set of second images belonging to a second domain.

At block 702, the first images in the set of first images are down sampled respectively to generate a set of first down-sampled images.

At block 703, the first down-sampled images in the set of first down-sampled images are processed respectively with a first initial generator to generate a set of first pre-translated images, a set of first mask images, and a set of first deformation parameters. Each first deformation parameter in the set of first deformation parameters corresponds to each pixel of the first image in the set of first images respectively.

At block 704, the first images in the set of first images are deformed respectively based on the set of first deformation parameters to obtain a set of first deformed images.

At block 705, each first deformed image in the set of first deformed images, each first pre-translated image in the set of first pre-translated images, and each first mask image in the set of first mask images are fused to obtain a set of third images.

At block 706, the third images in the set of third images are inputted to a first initial discriminator to obtain a set of first probabilities that each third image is a real image output from the first initial discriminator. The second images in set of second images are inputted to the first initial discriminator to obtain a set of second probabilities that each second image is a real image output from the first initial discriminator.

At block 707, the first initial generator and the first initial discriminator are corrected based on the set of first probabilities and the set of second probabilities, to generate a first target generator belonging to the first domain. The first target generator belonging to the first domain is configured to translate an image belonging to the first domain into an image belonging to the second domain.

Each first image in the set of first images matches a respective second image in the set of second images.

In detail, in cases that in the set of training samples, the first image of the set of first images matches a corresponding second image in the set of second images, each of the set of first down-sampled images may be used as the input of the first initial generator to translate the set of first down-sampled images respectively by the first initial generator to obtain the set of third images belonging to the second domain. The process of translating the set of first down-sampled images may refer to the above-mentioned method for translating an image according to embodiments of the disclosure, which is not described in detail here in order to avoid redundancy.

After the set of third images is obtained, the set of third images may be inputted to the first initial discriminator to obtain the set of first probabilities that each third image is a real image. Further, the set of second images may be inputted to the first initial discriminator to obtain a set of second probabilities that each second image is a real image. The first initial generator and the first initial discriminator may be corrected by comparing values of the set of first probabilities with values of the set of second probabilities.

In cases that one of the set of first probabilities is greatly different from a corresponding one of the set of second probabilities, an error of the image translation by the first initial generator is large. Therefore, the first initial generator and the first initial discriminator are corrected accordingly to obtain the first target generator belonging to the first domain. In cases that differences between the set of first probabilities and the set of second probabilities are small, the error of the image translation by the first initial generator is small. Therefore, there is no need to correct the first initial generator and the first initial discriminator. The first initial generator may be directly used as the first target generator belonging to the first domain. The first target generator belonging to the first domain may be used as an image translation model to translate the image belonging to the first domain into the image belonging to the second domain.

Therefore, the image translation model is trained, and an image is translated through the trained image translation model. The down-sampled image generated by down sampling the original image may be used as an input to reduce the computation burden of the image translation, while outputting the target translation image having the same size as the original image. In addition, the generated target translation image includes the deformed image deformed from the original image, which improves the effect of the image translation and reduces the computation burden of the image translation. Furthermore, the target translation image makes full use of high-definition and rich high-frequency detail information of the original image, which greatly improves the definition of the generated target translation image.

It should be noted that when processing an image, the feature information of the image is generally extracted and the feature information is processed accordingly to realize the image processing.

Accordingly, the block 703 may include processing the set of first down-sampled images respectively to determine a set of first feature vectors used in translating the first down-sampled image to the second domain; up sampling the set of first feature vectors respectively to generate a set of second feature vectors; and generating the set of first pre-translated images, the set of first mask images, and the set of first deformation parameters based on the set of the second feature vectors.

The process of processing the set of first down-sampled images respectively with the first initial generator to generate the set of first pre-translated images, the set of first mask images and the set of first deformation parameters may refer to above embodiments related to the method for translating an image, which is not described in detail here in order to avoid redundancy.

It may be understood that, in the disclosure, the size of an actually processed image is the same as the size of first down-sampled image in translating the first image. Performing up-sampling process only before the decoding the second feature vector into the first pre-translated image, the first mask image and the first deformation parameter not only ensures that the first pre-translated image and the first mask image are both the same size as the first image, but also significantly reduces the data processing amount during the image translation.

It should be noted that, in cases that a first image in the set of first images does not match a corresponding second image in the set of second images, the third image in the set of third images obtained by the above embodiments does not match the second image in the set of second images. Therefore, the first initial generator and the first initial discriminator cannot be corrected accurately based on the set of first probabilities and the set of second probabilities, such that the error of the image translation model is relatively large.

Figure 8:
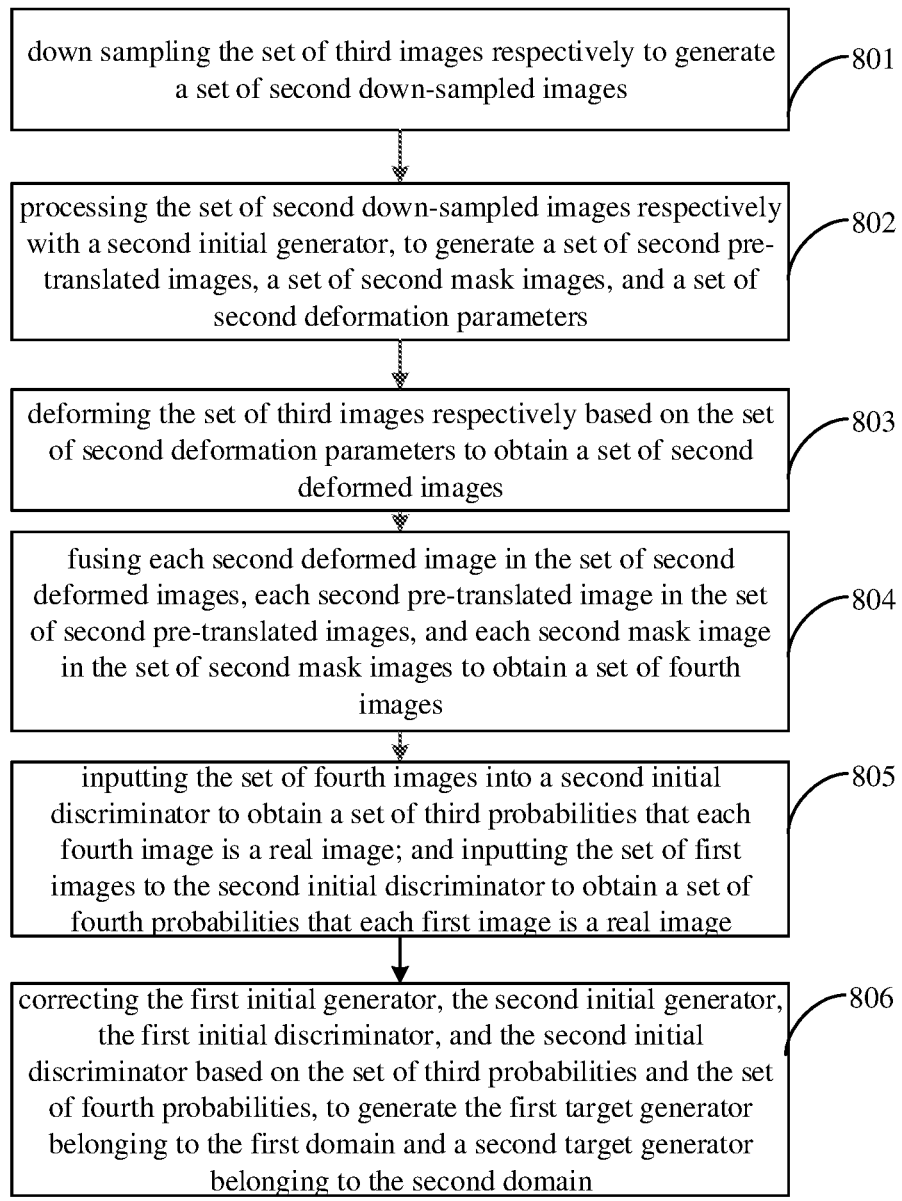
FIG. 8 is a schematic flowchart illustrating a method for training an image translation model according to embodiments of the present disclosure.

Therefore, in some embodiments of the disclosure, in cases that a first image in the set of first images does not match a corresponding second image in the set of second images, as illustrated in FIG. 8, after the block 707, the method may further include the following.

At block 801, third images in the set of third images are down sampled respectively to generate a set of second down-sampled images.

At block 802, the second down-sampled images in the set of second down-sampled images are processed respectively with a second initial generator, to generate a set of second pre-translated images, a set of second mask images, and a set of second deformation parameters.

At block 803, the third images in the set of third images are deformed respectively based on the set of second deformation parameters to obtain a set of second deformed images.

At block 804, each second deformed image in the set of second deformed images, each second pre-translated image in the set of second pre-translated images, and each second mask image in the set of second mask images are fused to obtain a set of fourth images.

At block 805, the fourth images in the set of fourth images are inputted to a second initial discriminator to obtain a set of third probabilities that each fourth image is a real image output by the second initial discriminator, and the set of first images are inputted to the second initial discriminator to obtain a set of fourth probabilities that each first image is a real image output by the second initial discriminator.

At block 806, the first initial generator, the second initial generator, the first initial discriminator, and the second initial discriminator are corrected based on the set of third probabilities and the set of fourth probabilities, to generate the first target generator belonging to the first domain and a second target generator belonging to the second domain. The first target generator belonging to the first domain is configured to translate an image in the first domain into an image in the second domain. The second target generator belonging to the second domain is configured to translate the image in the second domain into the image in the first domain.

In detail, in cases that in the set of training samples, a first image in the set of first images does not match a second image in the set of second images, the set of second down-sampled images may be used as inputs of the second initial generator to translate the set of second down-sampled images respectively to obtain the set of fourth images belonging to the first domain. The process of translating the set of second down-sampled images may refer to the method for translating an image according to above embodiments of the disclosure, which is not described in detail here in order to avoid redundancy.

After the set of fourth images is obtained, the fourth images in the set of fourth images are inputted to a second initial discriminator to obtain a set of third probabilities that each fourth image is a real image output by the second initial discriminator, and the first images in the set of first images are inputted to the second initial discriminator to obtain a set of fourth probabilities that each first image is a real image output by the second initial discriminator. The first initial generator, the second initial generator, the first initial discriminator, and the second initial discriminator may be corrected by comparing values of the set of third probabilities with values of the set of fourth probabilities.

In cases that a third probability is greatly different from a fourth probability, an error of the image translation by the by the first initial generator and the second initial generator is large. Therefore, the first initial generator, the second initial generator, the first initial discriminator and the second initial discriminator are corrected accordingly to obtain the first target generator belonging to the first domain and the second target generator belonging to the second domain. In cases that differences between the set of third probabilities and the set of fourth probabilities are small, the error of the image translation by the first initial generator and the second initial generator is relatively small. Therefore, there is no need to correct the first initial generator, the second initial generator, the first initial discriminator and the second initial discriminator, and the first initial generator may be directly used as the first target generator belonging to the first domain and the second initial generator as the second target generator belonging to the second domain. The first target generator belonging to the first domain may be used as an image translation model to translate the image in the first domain into the image in the second domain, and the second target generator belonging to the second domain may be used as another image translation model to translate the image in the second domain into the image in the first domain. The first target generator belonging to the first domain in embodiments may be the same as or different from the first target generator belonging to the first domain described above, which may be determined according to actual conditions.

Therefore, the image translation model is trained, and an image is translated through the trained image translation model. The down-sampled image generated by down sampling the original image may be used as an input to reduce the computation for the image translation while outputting the target translation image having the same size as the original image. In addition, the generated target translation image includes the deformed image deformed from the original image, which improves the effect of the image translation and reduces the computation burden of the image translation. Furthermore, the target translation image makes full use of high-definition and rich high-frequency detail information of the original image, which greatly improves the definition of the generated target translation image.

With the method for training an image translation model according to embodiments of the disclosure, the set of training samples is obtained. The set of training samples includes a set of first images belonging to a first domain and a set of second images belonging to a second domain. The first images in the set of first images are down-sampled respectively to generate the set of first down-sampled images. The first down-sampled images in the set of first down-sampled images are processed respectively with the first initial generator to generate the set of first pre-translated images, the set of first mask images, and the set of first deformation parameters. Each first deformation parameter in the set of first deformation parameters corresponds to each pixel of the first image in the set of first images respectively. The first images in the set of first images are deformed respectively based on the set of first deformation parameters to obtain the set of first deformed images. Each first deformed image in the set of first deformed images, each first pre-translated image in the set of first pre-translated images, and each first mask image in the set of first mask images to obtain the set of third images. The third images in the set of third images are inputted to the first initial discriminator to obtain the set of first probabilities that each third image is a real image. The second images in the set of second images are inputted to the first initial discriminator, to obtain the set of second probabilities that each second image is a real image. The first initial generator and the first initial discriminator are corrected based on the set of first probabilities and the set of second probabilities, to generate the first target generator belonging to the first domain. The first target generator belonging to the first domain is configured to translate an image in the first domain into an image in the second domain. Therefore, the image translation model is trained, and an image is translated through the trained image translation model. The down-sampled image generated by down sampling the original image may be used as an input to reduce the computation for the image translation while outputting the target translation image with the same size as the original image. In addition, The generated target translation image includes the deformed image deformed from the original image, which improves the effect of the image translation and reduces the computation burden of the image translation. Furthermore, the target translation image makes full use of high-definition and rich high-frequency detail information of the original image, which greatly improves the definition of the generated target translation image.

Figure 9:
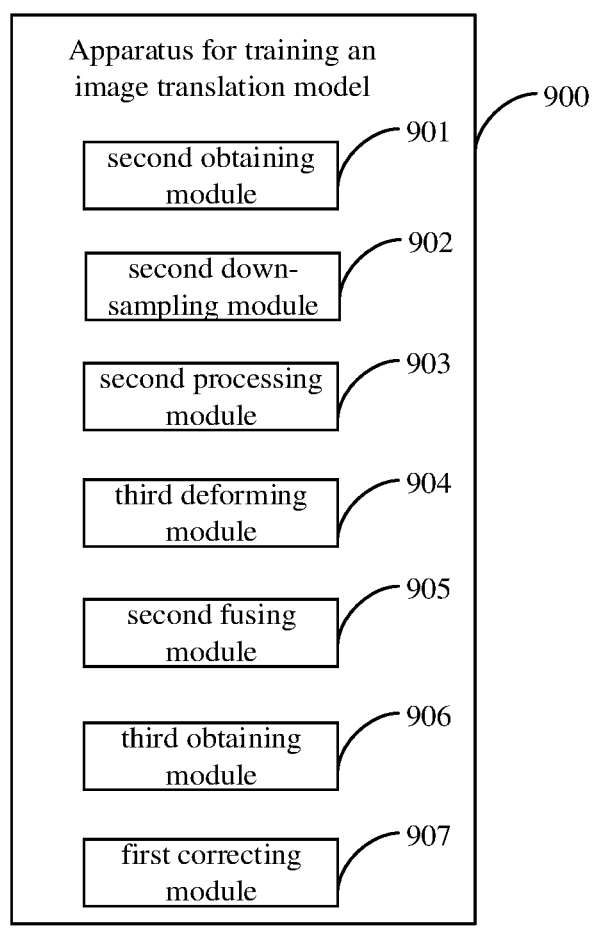
FIG. 9 is a structural schematic diagram illustrating an apparatus for training an image translation model according to embodiments of the present disclosure.

In order to implement the foregoing embodiment, embodiments of the disclosure also provides an apparatus for training an image translation model. The apparatus for training an image translation model may be integrated in an electronic device. FIG. 9 is a structural schematic diagram of an apparatus for training an image translation model according to embodiments of the disclosure.

As illustrated in FIG. 9, the apparatus 900 for training an image translation model may include a second obtaining module 901, a second down-sampling module 902, a second processing module 903, a third deforming module 904, a second fusing module 905, and a third obtaining module 906 and a first correcting module 907.

The second obtaining module 901 is configured to obtain a set of training samples, wherein the set of training samples comprise a set of first images belonging to a first domain and a set of second images belonging to a second domain; the second down-sampling module 902 is configured to down sample the set of first images respectively to generate a set of first down-sampled images; the second processing module 903 is configured to process the set of first down-sampled images respectively with a first initial generator to generate a set of first pre-translated images, a set of first mask images, and a set of first deformation parameters, wherein each first deformation parameter in the set of first deformation parameters corresponds to each pixel of the first image in the set of first images respectively; the third deforming module 904 is configured to deform the set of first images respectively based on the set of first deformation parameters to obtain a set of first deformed images; the second fusing module 905 is configured to fuse each first deformed image in the set of first deformed images, each first pre-translated image in the set of first pre-translated images, and each first mask image in the set of first mask images to obtain a set of third images; the third obtaining module 906 is configured to input the set of third images to a first initial discriminator to obtain a set of first probabilities that each third image is a real image, and input the set of second images to the first initial discriminator, to obtain a set of second probabilities that each second image is a real image; the first correcting module 907 is configured to correct the first initial generator and the first initial discriminator based on the set of first probabilities and the set of second probabilities, to generate a first target generator belonging to the first domain, wherein the first target generator belonging to the first domain is configured to translate an image in the first domain into an image in the second domain.

Figure 10:
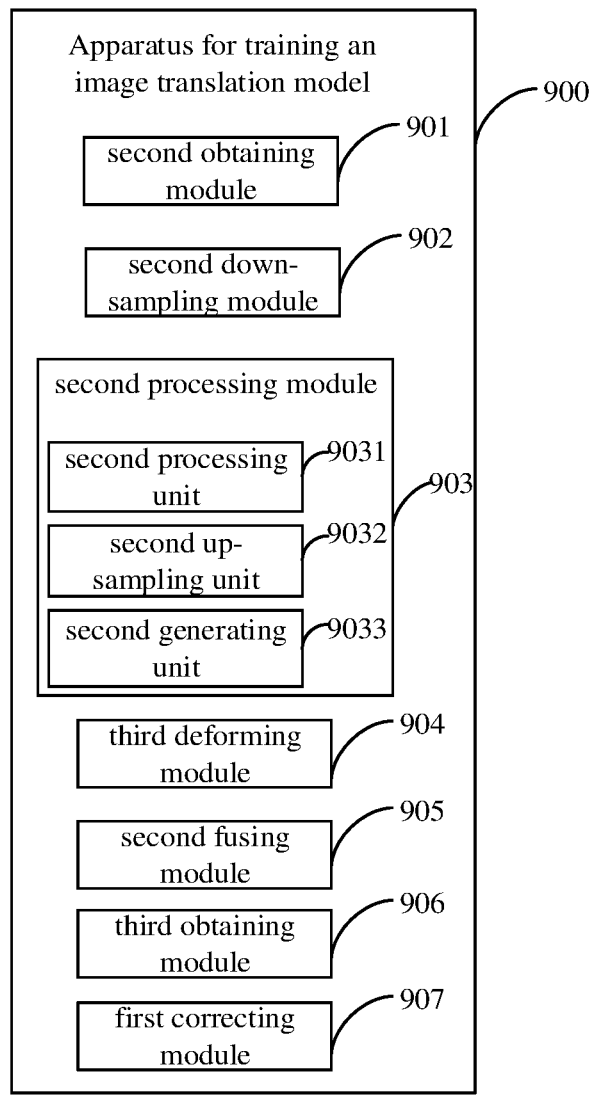
FIG. 10 is a structural schematic diagram illustrating an apparatus for training an image translation model according to embodiments of the present disclosure.

FIG. 10 is a structural schematic diagram of another apparatus for training an image translation model according to embodiments of the disclosure. As illustrated in FIG. 10, the second processing module 903 includes a second processing unit 9031, a second up-sampling unit 9032, and a second generating unit 9033.

Wherein the second processing unit 9031 is configured to process the set of first down-sampled images respectively to determine a set of first feature vectors obtained by translating the first down-sampled image to the second domain; second up-sampling unit 9032 is configured to up sample the set of first feature vectors respectively to generate a set of second feature vectors; the second generating unit 9033 is configured to generate the set of first pre-translated images, the set of first mask images, and the set of first deformation parameters based on the set of the second feature vectors.

In an embodiment of the disclosure, the set of first images match the set of second images respectively.

Figure 11:
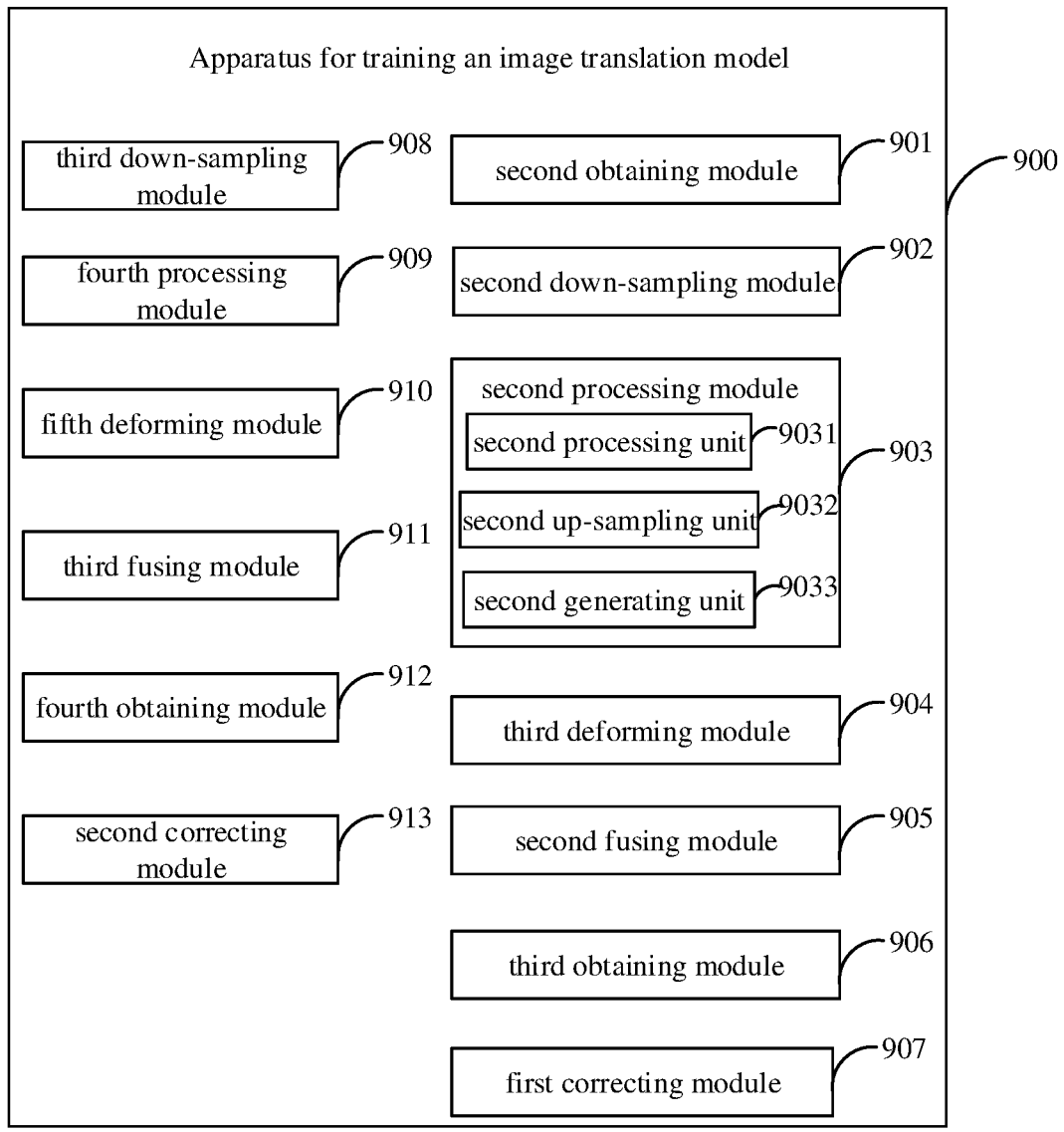
FIG. 11 is a structural schematic diagram illustrating an apparatus for training an image translation model according to embodiments of the present disclosure.

FIG. 11 is a structural schematic diagram of yet another apparatus for training an image translation model according to embodiments of the disclosure. In a possible implementation of the embodiment of the disclosure, in case that the first image in the set of first images does not match the second image in the set of second images, as illustrated in FIG. 11, the training apparatus further includes: a third down-sampling module 908, a fourth processing module 909, a fifth deforming module 910, a third fusing module 911, a fourth obtaining module 912, and a second correcting module 913.

Wherein the third down-sampling module 908 is configured to down sample the set of third images respectively to generate a set of second down-sampled images; the fourth processing module 909 is configured to process the set of second down-sampled images respectively with a second initial generator, to generate a set of second pre-translated images, a set of second mask images, and a set of second deformation parameters; the fifth deforming module 910 is configured to configured to deform the set of third images respectively based on the set of second deformation parameters to obtain a set of second deformed images; the third fusing module 911 is configured to fuse each second deformed image in the set of second deformed images, each second pre-translated image in the set of second pre-translated images, and each second mask image in the set of second mask images respectively to obtain a set of fourth images; the fourth obtaining module 912 is configured to input the set of fourth images to a second initial discriminator to obtain a set of third probability that each fourth image is a real image, and input the set of first images to the second initial discriminator to obtain a set of fourth probabilities that each first image is a real image; the second correcting module 913 is configured to correct the first initial generator, the second initial generator, the first initial discriminator, and the second initial discriminator based on the set of third probabilities and the set of fourth probabilities, to generate the first target generator belonging to the first domain and a second target generator belonging to the second domain, wherein the first target generator belonging to the first domain is configured to translate an image in the first domain into an image in the second domain, and the second target generator belonging to the second domain is configured to translate the image in the second domain into the image in the first domain.

It should be noted that, the details that are not disclosed in the apparatus for training an image translation model of the embodiment of the disclosure refer to the details disclosed in the method for the training image translation model of the embodiment of the disclosure, without repeating again herein.

In the apparatus for training an image translation model of the embodiment of the disclosure, a set of training samples is obtained by a second obtaining module, wherein the set of training samples comprise a set of first images belonging to a first domain and a set of second images belonging to a second domain; the set of first images respectively are down sampled to generate a set of first down-sampled images; the set of first down-sampled images are processed respectively with a first initial generator to generate a set of first pre-translated images, a set of first mask images, and a set of first deformation parameters, wherein each first deformation parameter in the set of first deformation parameters corresponds to each pixel of the first image in the set of first images respectively; the set of first images are deformed respectively based on the set of first deformation parameters to obtain a set of first deformed images; each first deformed image in the set of first deformed images, each first pre-translated image in the set of first pre-translated images, and each first mask image in the set of first mask images are fused to obtain a set of third images; the set of fourth images are inputted to a second initial discriminator to obtain a set of third probabilities that each fourth image is a real image; and the set of first images are inputted to the second initial discriminator to obtain a set of fourth probabilities that each first image is a real image; and the first initial generator, the second initial generator, the first initial discriminator, and the second initial discriminator are corrected based on the set of third probabilities and the set of fourth probabilities, to generate the first target generator belonging to the first domain and a second target generator belonging to the second domain, wherein the first target generator belonging to the first domain is configured to translate an image in the first domain into an image in the second domain, and the second target generator belonging to the second domain is configured to translate the image in the second domain into the image in the first domain. As a result, the image translation model is trained, and the image is translated through the trained image translation model. The original image may be down sampled and used as an input to reduce the computation for translating the image while the target translation image with the same size as the original image is output, and the generated target translation image includes the deformed image formed from the original image, which ensures image translation effect while reducing computation burden of translating the image. Furthermore, the target translation image makes full use of high-definition and rich high-frequency detail information of the input original image, which greatly improves the definition of the generated target translation image.

According to embodiments of the disclosure, the disclosure also provides an electronic device and a readable storage medium.

Figure 12:
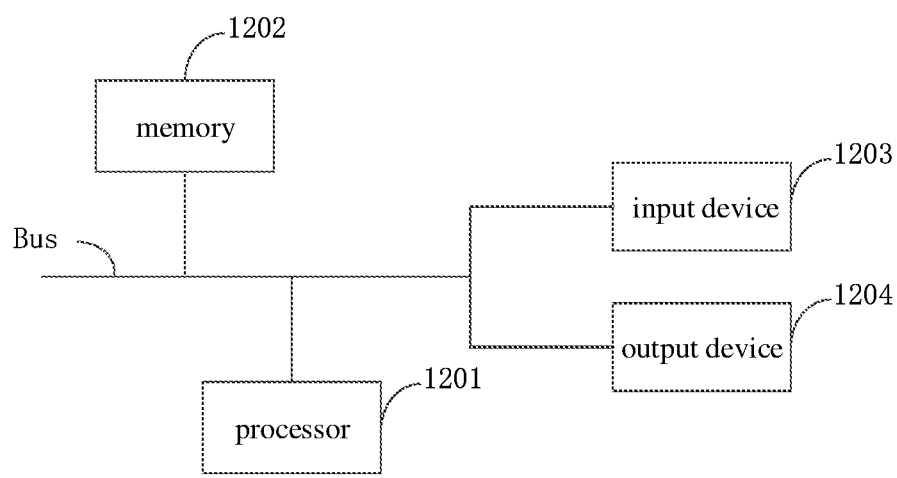
FIG. 12 is a block diagram illustrating an electronic device configured to implement a method for translating an image or a method for training an image translation model according to embodiments of the present disclosure.

FIG. 12 is a block diagram of an electronic device for implementing a method for translating an image and a method for training an image translation model according to embodiments of the disclosure. The electronic device aims to represent various forms of digital computers, such as a laptop computer, a desktop computer, a workstation, a personal digital assistant, a server, a blade server, a mainframe computer and other suitable computers. The electronic device may also represent various forms of mobile devices, such as a personal digital processing, a cellular phone, a smart phone, a wearable device and other similar computing devices. The components, connections and relationships of the components, and functions of the components illustrated herein are merely examples, and are not intended to limit the implementation of the disclosure described and/or claimed herein.

As illustrated in FIG. 12, the electronic device includes: one or more processors 1201, a memory 1202, and interfaces for connecting various components, including a high-speed interface and a low-speed interface. Various components are connected to each other with different buses, and may be mounted on a common main board or mounted in other ways as required. The processor may process instructions executed within the electronic device, including instructions stored in or on the memory to display graphical information of the GUI (graphical user interface) on an external input/output device (such as a display device coupled to an interface). In other implementations, multiple processors and/or multiple buses may be used together with multiple memories if necessary. Similarly, multiple electronic devices may be connected, and each electronic device provides a part of necessary operations (for example, as a server array, a group of blade servers, or a multiprocessor system). In FIG. 12, one processor 1201 is taken as an example.

The memory 1202 is a non-transitory computer readable storage medium provided by the disclosure. The memory is configured to store instructions executable by at least one processor, to cause the at least one processor to execute a method for translating an image and a method for training an image translation model provided by the disclosure. The non-transitory computer readable storage medium provided by the disclosure is configured to store computer instructions. The computer instructions are configured to enable a computer to execute a method for translating an image and a method for training an image translation model provided by the disclosure.

As the non-transitory computer readable storage medium, the memory 1202 may be configured to store non-transitory software programs, non-transitory computer executable programs and modules, such as program instructions/modules (such as, the first obtaining module 410, the first down-sampling module 420, the first generating module 430, the first deforming module 440, and the first fusing module 450 illustrated in FIG. 4, and the second obtaining module 901, the second down-sampling module 902, the second processing module 903, the third deforming module 904, the second fusing module 905, the third obtaining module 906 and the first correcting module 907 illustrated in FIG. 9) corresponding to a method for translating an image and a method for training an image translation model according to embodiments of the disclosure. The processor 1201 executes various functional applications and data processing of the server by operating non-transitory software programs, instructions and modules stored in the memory 1202, that is, implements a method for translating an image and a method for training an image translation model according to the above method embodiment.

The memory 1202 may include a storage program region and a storage data region. The storage program region may store an application required by an operating system and at least one function. The storage data region may store data created based on usage of the electronic device for translating an image. In addition, the memory 1202 may include a high-speed random access memory, and may also include a non-transitory memory, such as at least one disk memory device, a flash memory device, or other non-transitory solid-state memory device. In some embodiments, the memory 1202 may optionally include memories remotely located to the processor 1201 which may be connected to the electronic device capable of generating a route planning model via a network. Examples of the above network include, but are not limited to, the Internet, an intranet, a local area network, a mobile communication network and combinations thereof.

The electronic device capable of implementing a method for translating an image and a method for training an image translation model may also include: an input device 1203 and an output device 1204. The processor 1201, the memory 1202, the input device 1203, and the output device 1204 may be connected through a bus 1205 or in other means. In FIG. 12, the bus 1205 is taken as an example.

The input device 1203 may receive inputted digitals or character information, and generate key signal input related to user setting and function control of the electronic device capable of implementing a method for translating an image, such as a touch screen, a keypad, a mouse, a track pad, a touch pad, an indicator stick, one or more mouse buttons, a trackball, a joystick and other input device. The output device 1204 may include a display device, an auxiliary lighting device (e.g., LED), a haptic feedback device (e.g., a vibration motor), and the like. The display device may include, but be not limited to, a liquid crystal display (LCD), a light emitting diode (LED) display, and a plasma display. In some embodiments, the display device may be a touch screen.

The various implementations of the system and technologies described herein may be implemented in a digital electronic circuit system, an integrated circuit system, an application specific ASIC (application specific integrated circuit), a computer hardware, a firmware, a software, and/or combinations thereof. These various implementations may include: being implemented in one or more computer programs. The one or more computer programs may be executed and/or interpreted on a programmable system including at least one programmable processor. The programmable processor may be a special purpose or general purpose programmable processor, may receive data and instructions from a storage system, at least one input device and at least one output device, and may transmit the data and the instructions to the storage system, the at least one input device and the at least one output device.

These computing programs (also called programs, software, software applications, or codes) include machine instructions of programmable processors, and may be implemented by utilizing high-level procedures and/or object-oriented programming languages, and/or assembly/machine languages. As used herein, the terms "machine readable medium" and "computer readable medium" refer to any computer program product, device, and/or apparatus (such as, a magnetic disk, an optical disk, a memory, a programmable logic device (PLD)) for providing machine instructions and/or data to a programmable processor, including machine readable medium that receives machine instructions as machine readable signals. The term "machine readable signal" refers to any signal for providing the machine instructions and/or data to the programmable processor.

To provide interaction with a user, the system and technologies described herein may be implemented on a computer. The computer has a display device (such as, a CRT (cathode ray tube) or a LCD (liquid crystal display) monitor) for displaying information to the user, a keyboard and a pointing device (such as, a mouse or a trackball), through which the user may provide the input to the computer. Other types of devices may also be configured to provide interaction with the user. For example, the feedback provided to the user may be any form of sensory feedback (such as, visual feedback, auditory feedback, or tactile feedback), and the input from the user may be received in any form (including acoustic input, voice input or tactile input).

The system and technologies described herein may be implemented in a computing system including a background component (such as, a data server), a computing system including a middleware component (such as, an application server), or a computing system including a front-end component (such as, a user computer having a graphical user interface or a web browser through which the user may interact with embodiments of the system and technologies described herein), or a computing system including any combination of such background component, the middleware components, or the front-end component. Components of the system may be connected to each other through digital data communication in any form or medium (such as, a communication network). Examples of the communication network include a local area network (LAN), a wide area networks (WAN), and the Internet.

The computer system may include a client and a server. The client and the server are generally remote from each other and usually interact via the communication network. A relationship between the client and the server is generated by computer programs operated on a corresponding computer and having a client-server relationship with each other. The server may be a cloud server, also known as a cloud computing server or a cloud host, which is a host product in the cloud computing service system to solve difficult management and weak business scalability existed in traditional physical hosts and VPS services.

It should be understood that, steps may be reordered, added or deleted by utilizing flows in the various forms illustrated above. For example, the steps described in the disclosure may be executed in parallel, sequentially or in different orders, so long as desired results of the technical solution disclosed by the disclosure may be achieved without limitation herein.

The above detailed implementations do not limit the protection scope of the disclosure. It should be understood by the skilled in the art that various modifications, combinations, sub-combinations and substitutions may be made based on design requirements and other factors. Any modification, equivalent substitution and improvement made within the spirit and the principle of the disclosure shall be included in the protection scope of disclosure.

What is claimed is:

1. A method for translating an image, comprising:
   obtaining an image translation request, wherein the image translation request carries an original image;
   down sampling the original image to generate a down-sampled image corresponding to the original image;
   generating a pre-translated image corresponding to the original image, a mask image, and deformation parameters corresponding to each pixel of the original image based on the down-sampled image, wherein a size of the pre-translated image and a size of the mask image are the same as a size of the original image;
   deforming the original image based on the deformation parameters to generate a deformed image; and
   fusing the deformed image, the pre-translated image and the mask image to generate a target translation image,
   wherein fusing the deformed image, the pre-translated image, and the mask image to generate the target translation image comprises:
      for each pixel, determining a first weight for the pixel in the pre-translated image and a second weight for a corresponding pixel in the deformed image based on a pixel value of the pixel in the mask image; and
      fusing a pixel value of the pixel in the pre-translated image and a pixel value of the corresponding pixel in the deformed image based on the first weight and the second weight, to generate the target translation image.

2. The method of claim 1, wherein generating the pre-translated image, the mask image and the deformation parameters comprises:
   processing the down-sampled image to determine a first feature vector, wherein the first feature vector is used for translating the down-sampled image to a first domain to which the target translation image belongs;
   up sampling the first feature vector to generate a second feature vector; and
   generating the pre-translated image, the mask image and the deformation parameters based on the second feature vector.

3. The method of claim 1, further comprising:
   obtaining a first target generator based on a first domain carried in the image translation request, wherein the target translation image belongs to the first domain; and
   processing the down-sampled image with the first target generator, to generate the pre-translated image, the mask image, and the deformation parameters.

4. The method of claim 3, further comprising:
   in cases that the first domain corresponds to a plurality of first generators, recognizing the original image to determine a second domain to which the original image belongs; and
   obtaining the first target generator from the plurality of first generators based on the second domain and the first domain.

5. The method of claim 1, further comprising:
   recognizing the original image to determine a second domain to which the original image belongs;
   obtaining a second target generator based on the second domain; and
   processing the down-sampled image with the second target generator, to generate the pre-translated image, the mask image and the deformation parameters.

6. The method of claim 5, further comprising:
   in cases that the second domain corresponds to a plurality of second generators, obtaining a first domain to which the target translation image belongs; and obtaining the second target generator from the plurality of second generators based on the first domain and the second domain.

7. The method of claim 1, further comprising:
obtaining attribute parameters of an electronic device;
determining down-sampling coefficients based on the attribute parameters of the electronic device; and
down sampling the original image based on the down-sampling coefficients, to generate the down-sampled image corresponding to the original image.

8. A method for training an image translation model, comprising:
obtaining a set of training samples, wherein the set of training samples comprises a set of first images belonging to a first domain and a set of second images belonging to a second domain;
down sampling the set of first images respectively to generate a set of first down-sampled images;
processing the set of first down-sampled images respectively with a first initial generator to generate a set of first pre-translated images, a set of first mask images, and a set of first deformation parameters, wherein each first deformation parameter in the set of first deformation parameters corresponds to a respective pixel of a first image in the set of first images respectively;
deforming the set of first images respectively based on the set of first deformation parameters to obtain a set of first deformed images;
fusing each first deformed image in the set of first deformed images, each first pre-translated image in the set of first pre-translated images, and each first mask image in the set of first mask images to obtain a set of third images;
inputting the set of third images to a first initial discriminator to obtain a set of first probabilities that each third image is a real image;
inputting the set of second images to the first initial discriminator to obtain a set of second probabilities that each second image is a real image; and
correcting the first initial generator and the first initial discriminator based on the set of first probabilities and the set of second probabilities, to generate a first target generator belonging to the first domain, wherein the first target generator belonging to the first domain is configured to translate an image in the first domain into an image in the second domain;
wherein correcting the first initial generator and the first initial discriminator comprises:
in response to determining that a difference between a first probability in the set of first probabilities and a corresponding second probability in the set of second probabilities is larger than a threshold, correcting the first initial generator and the first initial discriminator based on the set of first probabilities and the set of second probabilities to generate the first target generator belonging to the first domain; and
in response to determining that differences between the set of first probabilities and the set of second probabilities are smaller than the threshold, using the first initial generator as the first target generator belonging to the first domain.

9. The method of claim 8, wherein processing the set of first down-sampled images comprises:
processing the set of first down-sampled images respectively to determine a set of first feature vectors, wherein the set of first feature vectors is used for translating the first down-sampled image to the second domain;
up sampling the set of first feature vectors respectively to generate a set of second feature vectors; and
generating the set of first pre-translated images, the set of first mask images, and the set of first deformation parameters based on the set of the second feature vectors.

10. The method of claim 8, wherein each first image in the set of first images matches a corresponding second image in the set of second images.

11. The method of claim 8, further comprising:
in cases that a first image in the set of first images does not match a corresponding second image in the set of second images, down sampling the set of third images respectively to generate a set of second down-sampled images;
processing the set of second down-sampled images respectively with a second initial generator, to generate a set of second pre-translated images, a set of second mask images and a set of second deformation parameters;
deforming the set of third images respectively based on the set of second deformation parameters to obtain a set of second deformed images;
fusing each second deformed image in the set of second deformed images, each second pre-translated image in the set of second pre-translated images, and each second mask image in the set of second mask images to obtain a set of fourth images;
inputting the set of fourth images to a second initial discriminator to obtain a set of third probabilities that each fourth image is a real image;
inputting the set of first images to the second initial discriminator to obtain a set of fourth probabilities that each first image is a real image; and
correcting the first initial generator, the second initial generator, the first initial discriminator, and the second initial discriminator based on the set of third probabilities and the set of fourth probabilities, to generate the first target generator belonging to the first domain and a second target generator belonging to the second domain, wherein the first target generator belonging to the first domain is configured to translate an image in the first domain into an image in the second domain, and the second target generator belonging to the second domain is configured to translate the image in the second domain into the image in the first domain.

12. An electronic device, comprising:
at least one processor; and
a memory communicatively coupled to the at least one processor, wherein the memory is configured to store instructions executable by the at least one processor, when the instructions are executed by the at least one processor, the at least one processor is configured to:
obtain an image translation request, wherein the image translation request carries an original image;
down sample the original image to generate a down-sampled image corresponding to the original image;
generate a pre-translated image corresponding to the original image, a mask image, and deformation parameters corresponding to each pixel of the original image based on the down-sampled image, wherein a size of the pre-translated image and a size of the mask image are the same as a size of the original image;
deform the original image based on the deformation parameters to generate a deformed image; and
fuse the deformed image, the pre-translated image, and the mask image to generate a target translation image;

wherein the processor is further configured to:
for each pixel, determine a first weight for the pixel in the pre-translated image and a second weight for a corresponding pixel in the deformed image based on a pixel value of the pixel in the mask image; and
fuse a pixel value of the pixel in the pre-translated image and a pixel value of the corresponding pixel in the deformed image based on the first weight and the second weight, to generate the target translation image.

13. The electronic device of claim 12, wherein the at least one processor is further configured to:
process the down-sampled image to determine a first feature vector, wherein the first feature vector is used for translating the down-sampled image to a first domain to which the target translation image belongs;
up sample the first feature vector to generate a second feature vector; and
generate the pre-translated image, the mask image, and the deformation parameters based on the second feature vector.

14. The electronic device of claim 12, wherein the at least one processor is further configured to:
obtain a first target generator based on a first domain carried in the image translation request, wherein the target translation image belongs to the first domain; and
process the down-sampled image with the first target generator, to generate the pre-translated image, the mask image, and the deformation parameters.

15. The electronic device of claim 14, wherein the at least one processor is further configured to:
in cases that the first domain corresponds to a plurality of first generators, recognize the original image to determine a second domain to which the original image belongs; and
obtain the first target generator from the plurality of first generators based on the second domain and the first domain.

16. The electronic device of claim 12, wherein the at least one processor is further configured to:
recognize the original image to determine a second domain to which the original image belongs;
obtain a second target generator based on the second domain; and
process the down-sampled image with the second target generator, to generate the pre-translated image, the mask image, and the deformation parameters.

17. The electronic device of claim 16, wherein the at least one processor is further configured to:
in cases that the second domain corresponds to a plurality of second generators, obtain a first domain to which the target translation image belongs; and
obtain the second target generator from the plurality of second generators based on the first domain and the second domain.

18. A non-transitory computer-readable storage medium, having computer instructions stored thereon, wherein the computer instructions are configured to cause a computer to execute a method for translating an image, the method comprising:
obtaining an image translation request, wherein the image translation request carries an original image;
down sampling the original image to generate a down-sampled image corresponding to the original image;
generating a pre-translated image corresponding to the original image, a mask image, and deformation parameters corresponding to each pixel of the original image based on the down-sampled image, wherein a size of the pre-translated image and a size of the mask image are the same as a size of the original image;
deforming the original image based on the deformation parameters to generate a deformed image; and
fusing the deformed image, the pre-translated image, and the mask image to generate a target translation image;
wherein fusing the deformed image, the pre-translated image and the mask image to generate the target translation image comprises:
for each pixel, determining a first weight for the pixel in the pre-translated image and a second weight for a corresponding pixel in the deformed image based on a pixel value of the pixel in the mask image; and
fusing a pixel value of the pixel in the pre-translated image and a pixel value of the corresponding pixel in the deformed image based on the first weight and the second weight, to generate the target translation image.

* * * * *